No. 625,945. Patented May 30, 1899.
F. L. WHITE & W. M. GILBERT.
CALCIUM CARBID CAKE.
(Application filed Mar. 14, 1898.)
(No Model.)
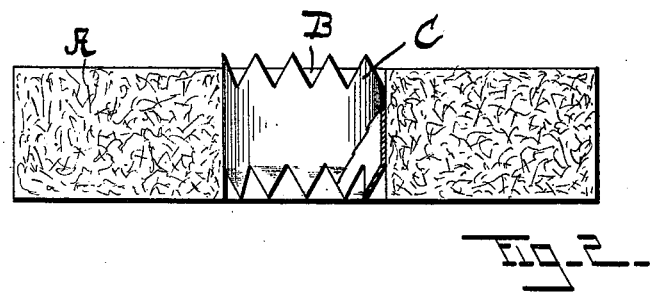
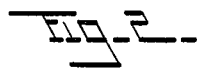
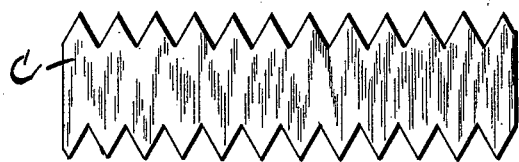
Witnesses.
Inventors.
Attorneys.

UNITED STATES PATENT OFFICE.

FREDERICK L. WHITE AND WILLIAM M. GILBERT, OF WATERBURY, CONNECTICUT, ASSIGNORS TO GEORGE H. CLOWES, OF SAME PLACE.

CALCIUM-CARBID CAKE.

SPECIFICATION forming part of Letters Patent No. 625,945, dated May 30, 1899.

Application filed March 14, 1898. Serial No. 673,785. (No specimens.)

*To all whom it may concern:*

Be it known that we, FREDERICK L. WHITE and WILLIAM M. GILBERT, citizens of the United States, residing at Waterbury, in the county of New Haven and State of Connecticut, have invented a certain new and useful Bushing for Cakes of Calcium Carbid, of which the following is a specification, reference being had therein to the accompanying drawings.

Our invention relates to the use of cakes of calcium carbid or some of the various compounds thereof in acetylene-lamps, and has especial reference to a form of lamp in which the carbid-chamber has a bottom of slightly-conical form and which uses a cake of carbid having a central opening, into which the apex of the bottom of the chamber projects. In such form of lamp the water is supplied to the carbid through a centrally-disposed tube which projects downwardly nearly to the bottom of the central opening in the cake, and which tube contains a suitable wicking or other conductor to regulate the flow of the water. The water being thus conducted to the bottom of the cake of carbid the decomposition of the latter as the gas is generated begins at the bottom of the cake and progresses upwardly through the same, and as the result of such action it has been found that the lime thus produced accumulates about the end of the water-conducting tube and hardens thereon in such manner as to obstruct the flow of the water and prevent the proper operation of the lamp. With a view to obviating this difficulty in the operation of lamps of this character we have devised the bushing hereinafter described, to be applied to the central opening in the carbid cake, which bushing secures an unobstructed space surrounding the water-conducting tube.

Our invention therefore consists in the bushing for such purpose constructed and operating as hereinafter fully described, and particularly pointed out in the claim.

Referring to the drawings, Figure 1 is a view of the strip of flexible material from which the bushing devised by us is formed. Fig. 2 is a cross-section of a cake or carbid having applied thereto the bushing embodying the invention.

The letter A designates a cake of calcium carbid or one of the numerous compounds thereof, of the proper size and shape to be used in a lamp for burning acetylene gas, through the center of which cake extends the opening B. In such forms of lamp in which the carbid-chamber has a conical bottom the apex of said bottom projects upwardly into said opening B and the tube which conducts water to said chamber projects downwardly into said opening nearly to the bottom of the cake. In such lamps it has been found that as the cake disintegrates from its bottom upwardly by the action of the water the resulting lime collects about the lower end of the supply-tube in such manner as to impede the passage of the water to the cake, and thus checks, if it does not entirely shut off, the generation of the gas. We have found that this difficulty can be entirely obviated by applying to said cake a bushing C of flexible material, which is held by its own expansion against the wall of the opening B, as shown in Fig. 2. The said bushing is preferably formed from a strip of reasonably-thick unglazed paper, as shown in Fig. 1, with its side edges serrated, so that it can be used with either of its edges uppermost. When said strip is rolled into ring form and is thrust downwardly into the opening B against the conical bottom of the carbid-chamber, (not shown,) the serrated lower edge thereof is caused to converge toward the center of the opening, as shown in partial section in Fig. 2, thus forming a tapering annular shield surrounding the lower end of the water-supply tube to prevent the lime from collecting about said tube, while the bottoms of the serrations in said edge form openings to permit the free passage of water from said tube to the cake. By making said bushing from paper of the character mentioned we not only secure cheapness of production, but are also enabled to utilize the absorbent qualities of said material to equalize the distribution of the water to the cake in case the lamp should be tilted out of a horizontal position.

By the use of the bushing herein described the cake of carbid is disintegrated evenly and a steady supply of gas is secured until the gas-producing properties of said cake are entirely exhausted.

Having thus fully described our invention, what we claim, and desire to secure by Letters Patent, is—

The combination with a cake of calcium carbid or similar material having a centrally-disposed opening extending therethrough, of a bushing composed of flexible material adapted to be inserted within the opening in said cake, said bushing having its lower edge serrated, substantially as described.

In testimony whereof we affix our signatures in presence of two witnesses.

FREDERICK L. WHITE.
WILLIAM M. GILBERT.

Witnesses:
GEORGE E. HALL,
EDWARD R. LEZOTT.